(12) United States Patent
Shropshire

(10) Patent No.: US 12,275,121 B2
(45) Date of Patent: Apr. 15, 2025

(54) LINEMAN'S FLIP SOCKET

(71) Applicant: MADI, LLC, Greenville, SC (US)

(72) Inventor: Aaron Shropshire, Hedgesville, WV (US)

(73) Assignee: MADI, LLC, Greenville, SC (US)

( * ) Notice: Subject to any disclaimer, the term of this patent is extended or adjusted under 35 U.S.C. 154(b) by 378 days.

(21) Appl. No.: 17/830,569

(22) Filed: Jun. 2, 2022

(65) Prior Publication Data

US 2022/0388129 A1    Dec. 8, 2022

Related U.S. Application Data

(60) Provisional application No. 63/196,292, filed on Jun. 3, 2021.

(51) Int. Cl.
*B25B 13/50* (2006.01)
*B25B 23/00* (2006.01)
*H02G 1/02* (2006.01)

(52) U.S. Cl.
CPC .......... *B25B 13/50* (2013.01); *B25B 23/0035* (2013.01); *H02G 1/02* (2013.01)

(58) Field of Classification Search
CPC . B25B 23/0035; B25B 13/50; B25B 13/5091; B25B 13/065; H02G 1/02; H02G 1/04
See application file for complete search history.

(56) References Cited

U.S. PATENT DOCUMENTS

| | | | | |
|---|---|---|---|---|
| 3,071,995 A * | 1/1963 | Ruthrauff, Jr. | ........ | B25B 13/065 81/124.2 |
| 3,086,414 A * | 4/1963 | Nardi | ....................... | F16B 37/16 81/176.1 |
| D379,420 S * | 5/1997 | Standlee | ......................... | D8/70 |
| 6,314,841 B1 * | 11/2001 | Burk | ......................... | B25F 1/02 81/124.2 |
| 6,354,176 B1 * | 3/2002 | Nordlin | ................... | B25B 13/06 81/121.1 |
| 6,715,384 B1 * | 4/2004 | Kozak | ................. | B25B 13/5091 81/176.15 |
| 7,434,494 B1 * | 10/2008 | Snider | ................... | B25B 13/102 81/177.4 |
| 7,802,499 B2 * | 9/2010 | Stephens | ............... | B25B 13/065 81/125 |
| 8,424,423 B2 * | 4/2013 | Su | ....................... | B25B 23/0014 81/177.85 |
| 9,272,395 B2 * | 3/2016 | Hui | ....................... | B25B 13/065 |
| 10,124,471 B2 * | 11/2018 | Sturner | ............... | B25B 13/5091 |
| 10,259,107 B2 * | 4/2019 | Wang | ................... | B25B 23/0035 |
| 10,953,521 B2 * | 3/2021 | Zimmermann | ....... | B25B 13/065 |
| 10,994,391 B2 * | 5/2021 | Flory | ................... | B25B 13/065 |
| 11,179,831 B2 * | 11/2021 | Zimmermann | ..... | B25B 23/0035 |

(Continued)

*Primary Examiner* — David B. Thomas
(74) *Attorney, Agent, or Firm* — Shumaker, Loop & Kendrick, LLP; Brandon C. Trego

(57) ABSTRACT

A flip socket is disclosed. The flip socket including a socket body having a central section extending between a first socket positioned on a first end of the central section and a second socket positioned on a second end of the central section, wherein a centerline extends through a longitudinal axis of the socket body; and a coupler adapted to engage one of the first and second sockets, the coupler connecting the flip socket to a driving device to drive a fastener or device.

18 Claims, 7 Drawing Sheets

(56) References Cited

U.S. PATENT DOCUMENTS

| | | | | |
|---|---|---|---|---|
| 11,318,591 B2* | 5/2022 | Minor | ............... | B25B 23/0035 |
| 11,407,088 B2* | 8/2022 | Gimondo | ............ | B25B 13/5091 |
| 11,554,469 B2* | 1/2023 | Chiang | ............... | B25B 23/0035 |
| 2008/0011128 A1* | 1/2008 | Stephens | ................. | B25B 23/12 |
| | | | | 81/124.2 |
| 2008/0041193 A1* | 2/2008 | Baker | .................... | B25B 13/06 |
| | | | | 81/124.6 |
| 2008/0121073 A1* | 5/2008 | Williams | ............... | B25B 13/02 |
| | | | | 81/121.1 |
| 2015/0151412 A1* | 6/2015 | Chen | .................. | B25B 23/0035 |
| | | | | 81/124.5 |
| 2020/0016729 A1* | 1/2020 | Zimmermann | ....... | B25B 21/007 |
| 2020/0164491 A1* | 5/2020 | Flory | ................... | B25B 13/065 |

\* cited by examiner

LINEMAN'S FLIP SOCKET

BACKGROUND OF THE INVENTION

This invention relates generally to a fastener driving tool, and more particularly to a flip socket for use by utility workers.

Utility workers (e.g., "linemen") frequently carry out installation, maintenance, or repair on electrical transmission or distribution equipment in the field. This work involves removing and installing numerous shapes and sizes of fasteners and connections such as nuts, bolts, and threaded hooks and eyes.

There is a need for utility workers to have the appropriate tools available at hand while minimizing the number of separate tools to be transported and the likelihood of losing tools.

BRIEF SUMMARY OF THE INVENTION

This need is addressed by the present invention, which provides a flip socket suitable for driving multiple sizes of fasteners and connections.

According to an aspect of the invention, a flip socket includes a socket body having a central section extending between a first socket positioned on a first end of the central section and a second socket positioned on a second end of the central section, wherein a centerline extends through a longitudinal axis of the socket body; and a coupler adapted to engage one of the first and second sockets, the coupler connecting the flip socket to a driving device to drive a fastener or device.

According to another aspect of the invention, a flip socket includes a socket body having a central section extending between a first socket positioned on a first end of the central section and a second socket positioned on a second end of the central section, wherein a centerline extends through a longitudinal axis of the socket body; and a coupler adapted to engage one of the first and second sockets, the coupler connecting the flip socket to a driving device to drive a fastener or device. The coupler including a first end having a cylindrical nose and a square drive section, the square drive section adapted to engage a drive recess of one of the first and second sockets; and a second end forming a drive shank, the drive shank having a circumferential locking groove near a distal end of thereof.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
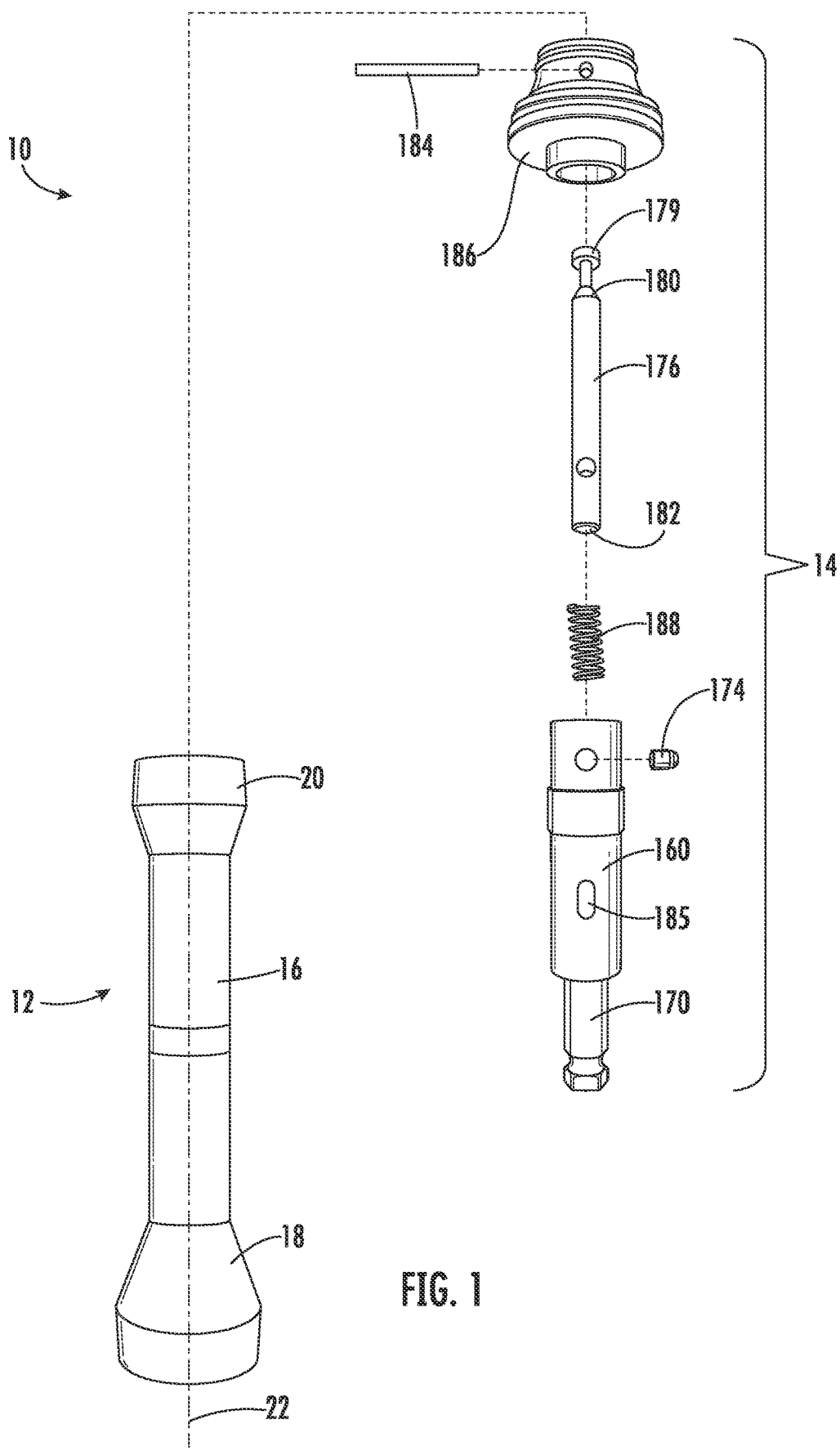
FIG. 1 is an exploded view of a flip socket according to an exemplary embodiment of the present invention.
Figure 2:
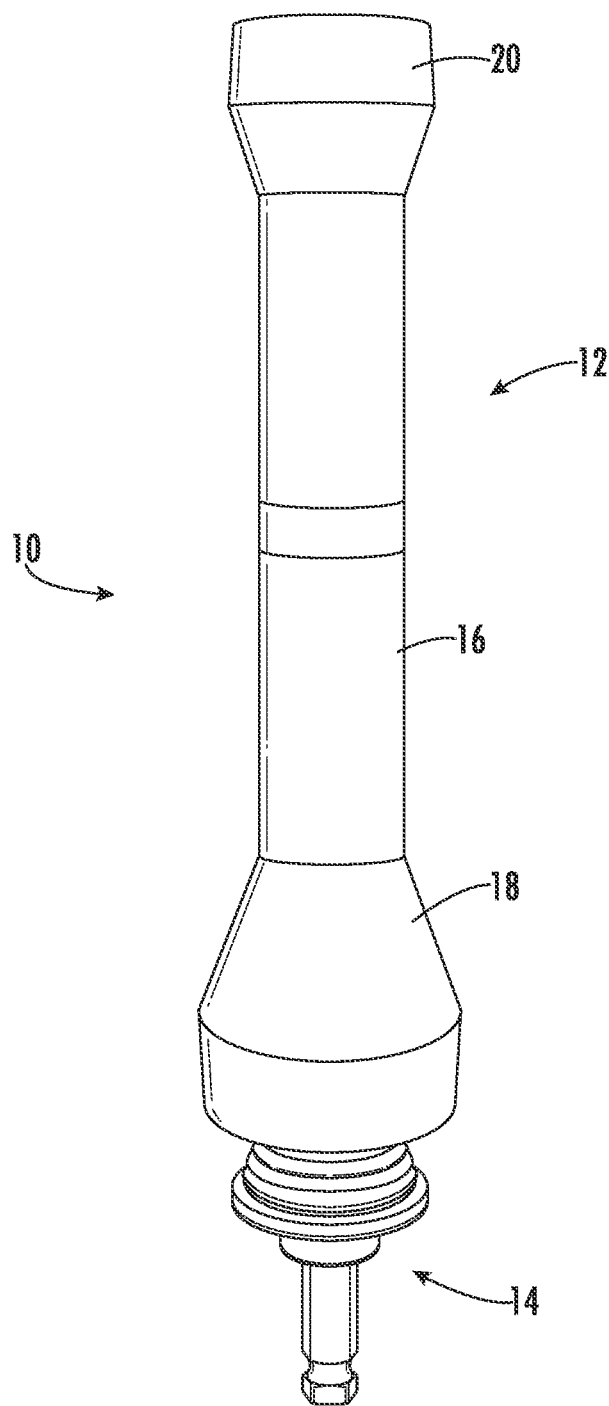
FIG. 2 is a front view of the flip socket of FIG. 1, showing a coupler attached to a first socket thereof.
Figure 3:
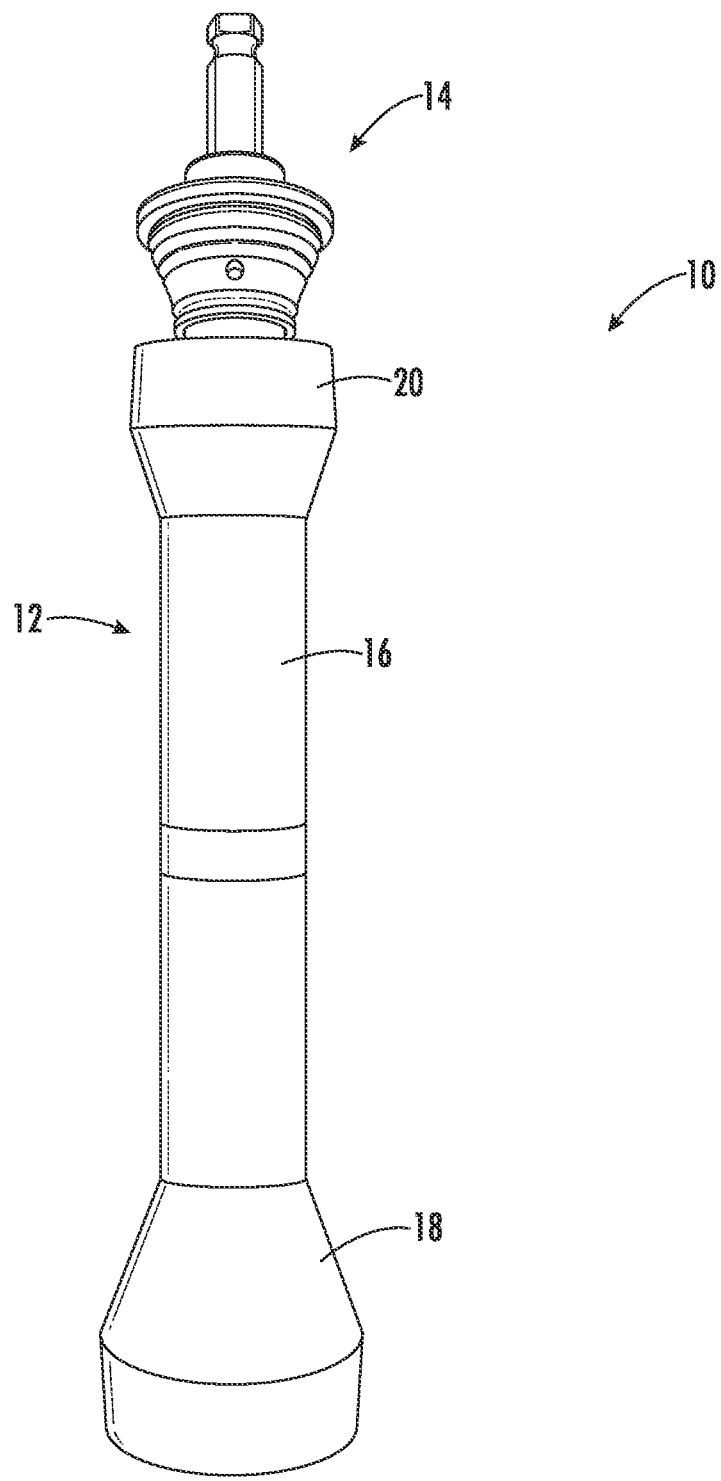
FIG. 3 is a front view of the flip socket of FIG. 1, showing a coupler attached to a second socket thereof.

Referring to the drawings wherein identical reference numerals denote the same elements throughout the various views, FIGS. 1-3 illustrate an exemplary flip socket 10, comprising a double-ended socket body 12 and a coupler 14.

The socket body 12 is a unitary element. It could be made by forging, casting, machining from solid stock or the like. It may be made from any material having suitable strength such as a metal alloy. Alternatively, plastics or composites could be employed depending on the specific end use.

Figure 4:
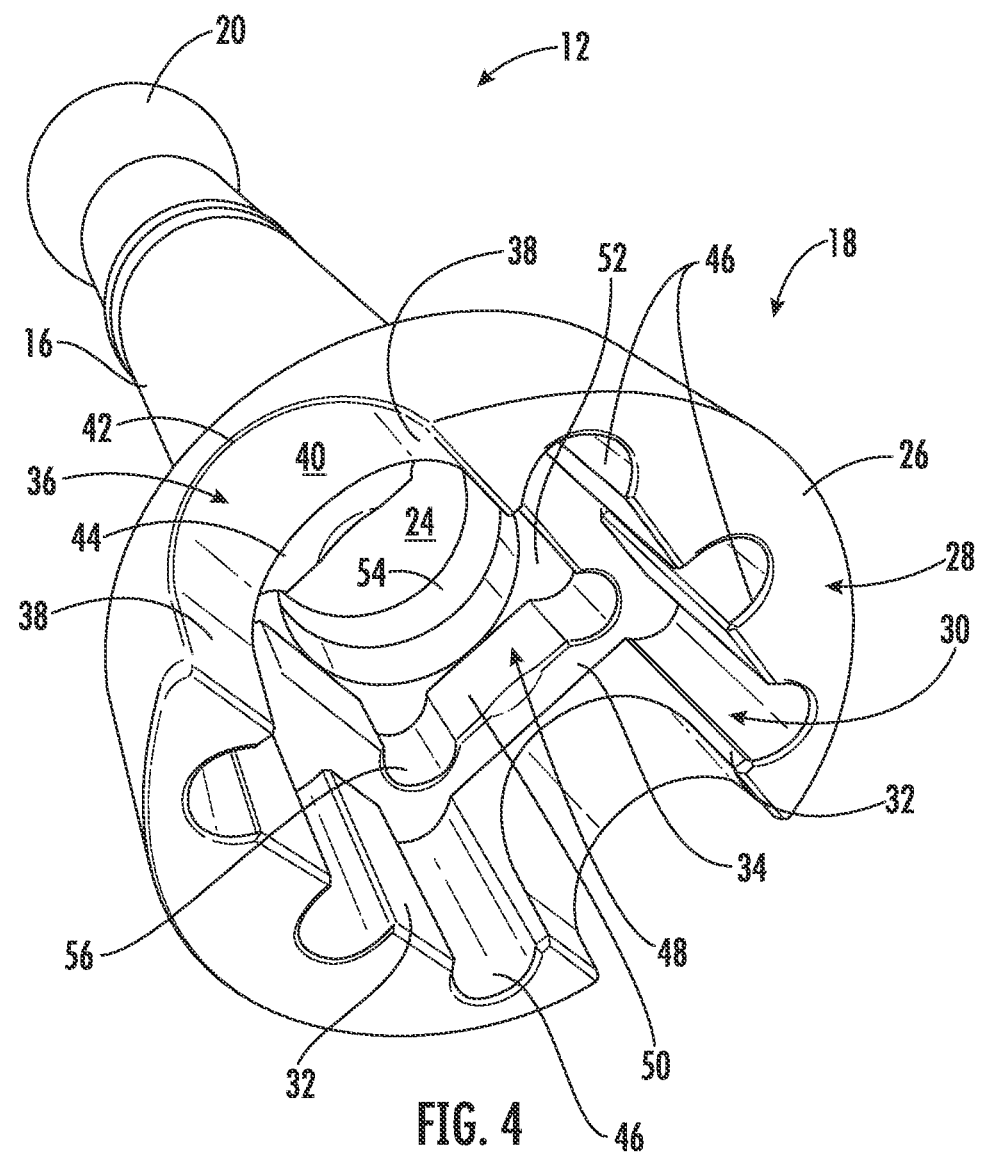
FIG. 4 is a perspective view of the first socket of the flip socket of FIG. 1.

The socket body 12 is elongated with a central section 16 extending between a first socket 18 and a second socket 20. For reference, a centerline 22 extends through the longitudinal axis of the socket body 12. In the illustrated example the central section 16 is hollow with a central through-bore 24 (FIG. 4). Alternatively, it could be of solid construction. In this example the exterior surface is cylindrical. Other shapes such as polygons could be used.

The first socket 18 is bounded by a peripheral wall 26 that terminates at an end face 28 oriented normal to the centerline 22. The interior of the first socket 18 includes numerous surfaces which define structural elements for driving different kinds of fasteners. These structures may be referred to as "driving elements".

One driving element is an outer square drive recess 30 that is positioned adjacent the end face 28. This is defined by four flat faces 32 arranged as two pairs of parallel faces. As will be described below, these faces 32 are intersected by numerous other structures, and thereby do not form a physically continuous square. An intermediate face 34, oriented normal to the centerline 22, is disposed at the bottom of the outer square drive recess 30.

The outer square drive recess 30 is useful for driving fasteners such as nuts and bolts. In one example, the outer square drive recess 30 can be sized for engaging and driving square nuts having outside dimensions of approximately 25 mm (1 in.) to 29 mm (1⅛ in.).

Another driving element is a pair of cross slots 36 that extend axially inward from the end face 28 and pass through the peripheral wall 26, bisecting the peripheral wall 26 into two sections (and intersecting the outer square drive recess 30). Each of the cross slots 36 is bounded by opposed, parallel side faces 38 which blend into a concave, arcuate bottom face 40. The bottom faces 40 are "angled". More specifically, the bottom faces 40 are oriented at an acute angle to the centerline 22, such that the outboard edge 42 of each cross slot 36 is closer to the end face 28 than the inboard edge 44 of the cross slot 36.

The cross slots 36 are useful for driving fasteners or objects extending in a transverse direction, such as T-handles. The angled orientation is also helpful in engaging rounded fasteners such as eye bolts and hooks.

Another driving element is a plurality of outer drive slots 46 that are arrayed around the outer square drive recess 30. The outer drive slots 46 extend parallel to the centerline 22, have a generally semi-circular cross-sectional shape, and are open to the outer square drive recess 30. In the illustrated example, six outer drive slots 46 are provided, arranged as three opposing pairs. One pair is located in the center of one of the flat faces 32, oriented 90 degrees to the cross slots 36. Two of the pairs are located at the intersections (i.e. corners) of the flat faces 32. This arrangement provides for engagement of two different diameters of fasteners.

The outer drive slots 46 are useful for driving fasteners such as hooks and eyes. In one example, the outer drive slots 46 can be sized for driving eyebolts, screw eyes, or nut eyes of 16 mm (⅝ inch) or 19 mm (¾ inch) nominal dimensions.

Another driving element is an inner square drive recess 48, defined by four walls 50 which extend axially inward from the intermediate face 34 and terminate at a bottom floor 52. The inner square drive recess 48 adjoins the through-bore 24. The through-bore 24 has a circumferential lock groove 54 formed therein, a short distance from the drive recess floor 52.

The inner square drive recess 48 is useful for driving fasteners such as nuts and bolts. In one example, the outer square drive recess 30 is sized for engaging in driving square nuts or fastener heads having outside dimensions of approximately 19 mm (¾ inch). It is also sized and shaped to engage a nose of the coupler 14, described in more detail below.

Another driving element is a plurality of inner drive slots 56 that are arrayed around the inner square drive recess 48. The inner drive slots 56 extend parallel to the centerline 22, have a generally semi-secular cross-sectional shape, and are open to the inner square drive recess 48. In the illustrated example, four inner drive slots 56 are provided, arranged as two opposing pairs. The pairs are located at the intersections of the walls 50.

The inner drive slots 56 are useful for driving fasteners such as hooks and eyes. In one example, the inner drive slots 56 are sized for driving eyebolts, screw eyes, or nut eyes of 13 mm (½ inch) or 16 mm (⅝ inch) nominal dimensions.

Figure 5:
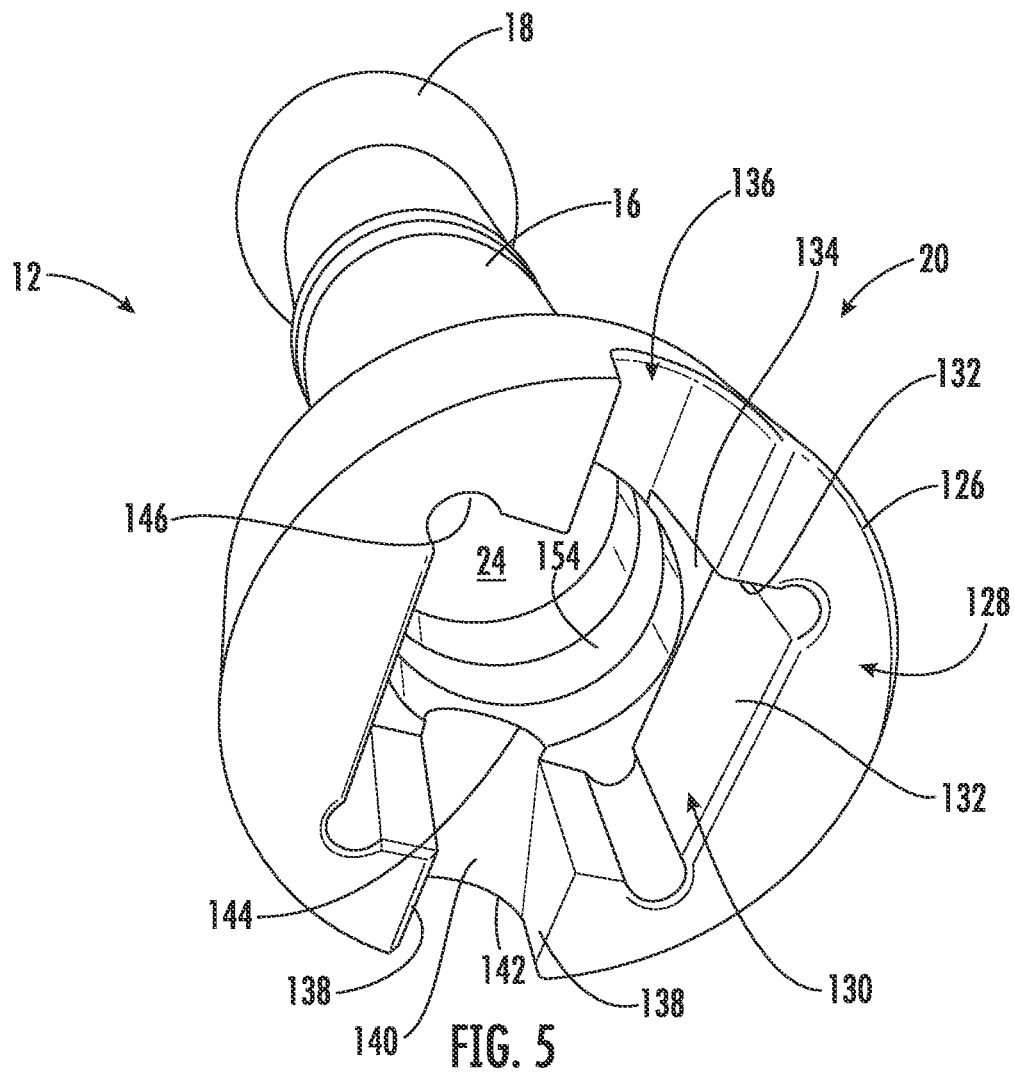
FIG. 5 is a perspective view of the second socket of the flip socket of FIG. 1.

Referring to FIG. 5, the second socket 20 is bounded by a peripheral wall 126 that terminates at an end face 128 oriented normal to the centerline 22. The interior of the second socket 20 includes numerous surfaces which define structural elements for driving different kinds of fasteners. These structures may be referred to as "driving elements".

One driving element is a square drive recess 130 positioned adjacent the end face 128. This is defined by four flat faces 132 arranged in two pairs of parallel faces. As will be described below, these faces 132 are intersected by other structures, and thereby do not form a physically continuous square. A bottom face 134, oriented normal to the centerline 22, is disposed at the bottom of the square drive recess 130.

The square drive recess 130 adjoins the through-bore 24. The through-bore 24 has a circumferential lock groove 154 formed therein, a short distance from the drive recess bottom face 134.

The square drive recess 130 is useful for driving fasteners such as nuts and bolts. In one example, the square drive recess 130 can be sized for engaging in driving square nuts having outside dimensions of approximately 19 mm (¾ inch), or similarly sized bolts or lag screws. It is also sized and shaped to engage a nose of the coupler 14, described in more detail below.

Another drive element is a pair of cross slots 136 that extends axially inward from the end face 128 and passes through the peripheral wall 126, bisecting the peripheral wall 126 into two sections (and intersecting the square drive recess 130). Each of the cross slots 136 is bounded by opposed, parallel side faces 138 which blend into a concave, arcuate bottom face 140. The bottom faces 141 are "angled". More specifically, the bottom faces 140 are oriented at an acute angle to the centerline 22, such that the outboard edge 142 of each cross slot 136 is closer to the end face 128 than the inboard edge 144 of the cross slot 136.

The cross slots 136 are useful for driving fasteners or objects extending in a transverse direction, such as T-handles. The angled orientation is also helpful in engaging rounded fasteners such as eye bolts and hooks.

Another drive element is a plurality of drive slots 146 arrayed around the square drive recess 130. The drive slots 146 extend parallel to the centerline 22, have a generally semi-secular cross-sectional shape, and are open to the square drive recess 130. In the illustrated example, four drive slots 146 are provided, arranged as two opposing pairs. The pairs are located at the intersections of the faces 132.

The drive slots 146 are useful for driving fasteners such as hooks and eyes. In one example, the drive slots 146 are sized for driving eyebolts, screw eyes, or nut eyes of 13 mm (½ in.) or 16 mm (⅝ in.) nominal dimensions.

Figure 6:
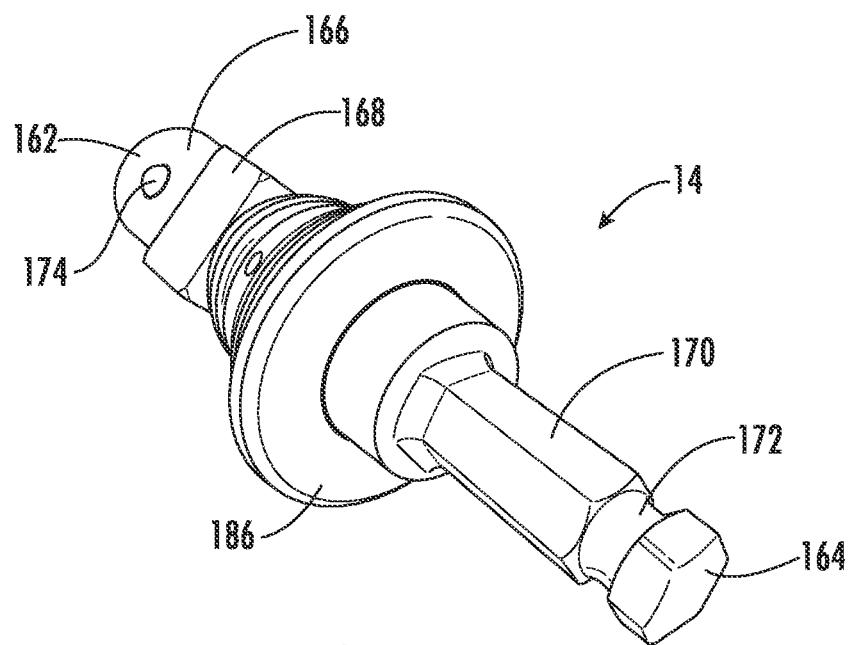
FIG. 6 is a perspective view of the coupler shown in FIG. 1.
Figure 7:
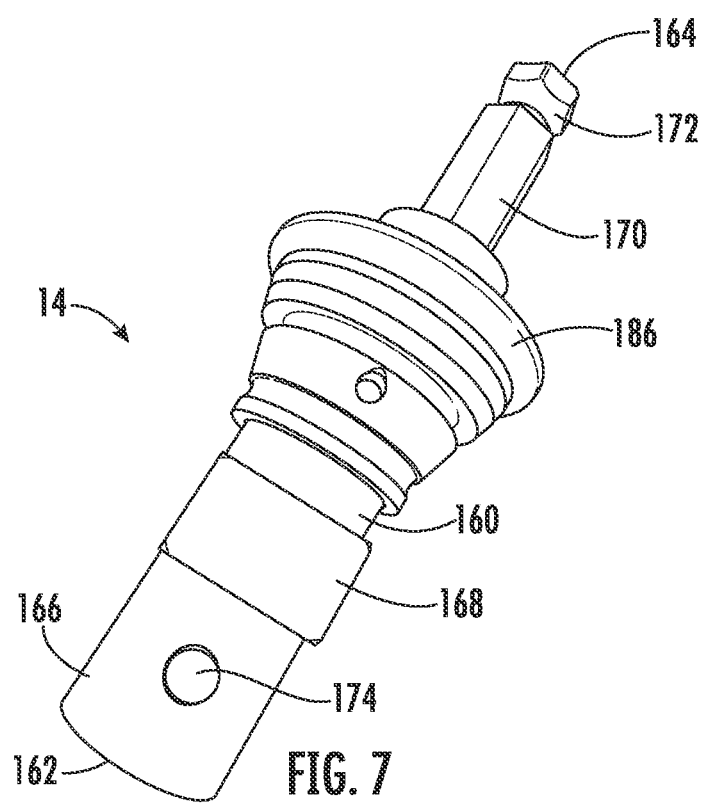
FIG. 7 is another perspective view of the coupler shown in FIG. 1.
Figure 8:
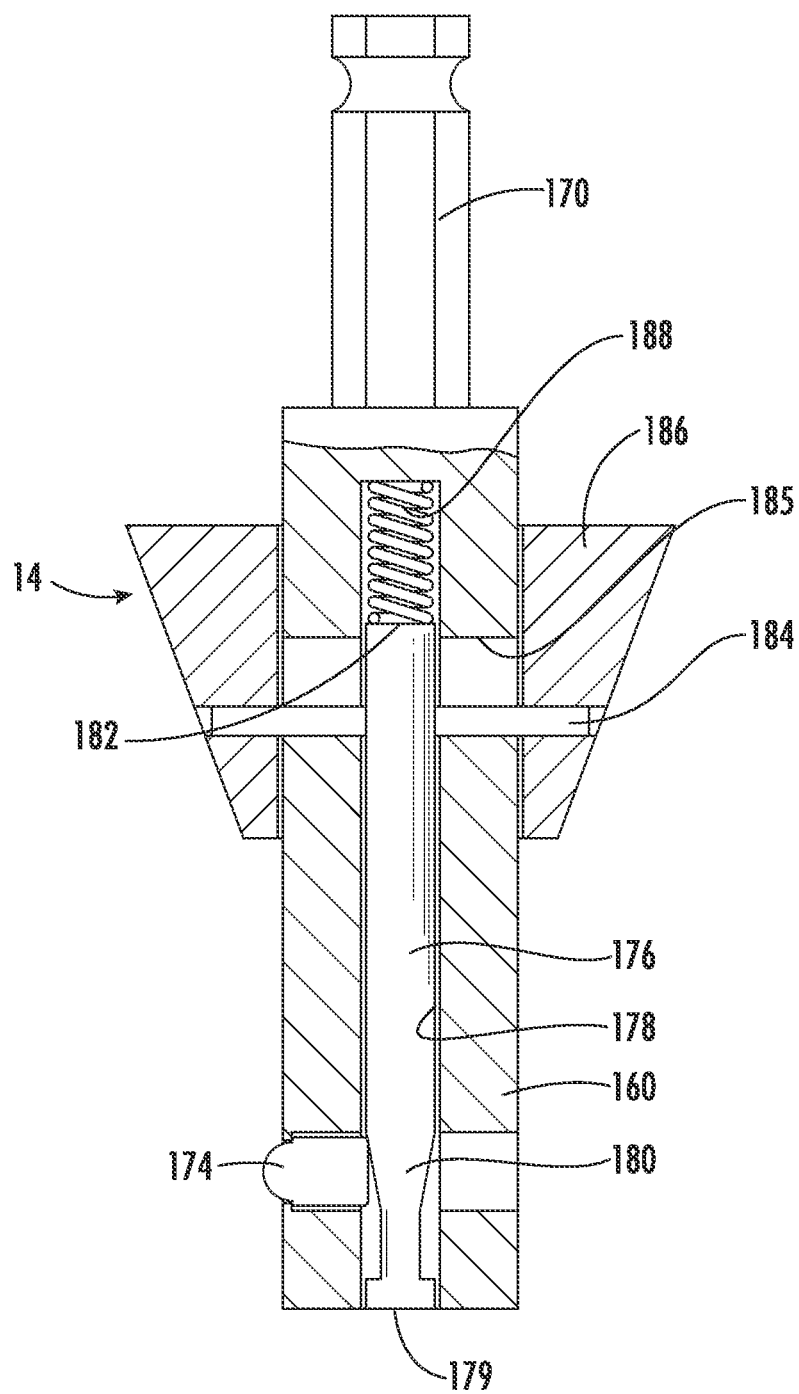
FIG. 8 is a cross-sectional view of the coupler.

FIGS. 6-8 illustrate the coupler 14 in more detail. The coupler 14 has a body 160 extending between a first end 162 and a second end 164. The first end 162 is formed into a cylindrical nose 166 and a square drive section 168. The square drive section 168 is shaped and sized to fit into the square drive recesses 48, 130 described above.

The second end 164 is formed into a drive shank 170. In the illustrated example this is hexagonal and includes a circumferential locking groove 172 near a distal end thereof.

A lock pin 174 with a hemispherical end extends through an opening in the nose 166. The lock pin 174 contacts a plunger 176 which slides in a central bore 178 of the body 160. The plunger 176 has a first end 179 with a tapered section 180 and a second end 182. The plunger 176 is retained in the body 160 by a retainer pin 184 which passes through the plunger 176, a slot 185 in the body 160, and into a handle 186. A spring 188 is trapped between the plunger 176 and the body 160.

In a first or locked position, the spring 188 forces the plunger 176 axially towards the nose 166, forcing the lock pin 174 to an outboard position. Pulling the handle 186 in the opposite direction compresses the spring 188, retracts the plunger 176 so that the tapered section 180 clears the lock pin 174, and allows the lock pin 174 to move inboard, retracting flush or below the surface of the nose 166.

The flip socket 10 is used by connecting the socket body 12 to the coupler 14. In FIG. 2, the coupler 14 is connected to the first socket 18 by engaging the square drive section 168 of the coupler 14 with the inner square drive recess 48 of the first socket 18. The lock pin 174 will engage the circumferential lock groove 54, preventing accidental disconnection. When assembled in this configuration, the drive shank 170 can be coupled to a driving device such as a ratchet handle, drill-driver, or impact driver (not shown). The second socket 20 is open to engage and drive one or more fasteners or devices as described above.

In FIG. 3, the coupler 14 is connected to the second socket 20 by engaging the square drive section 168 of the coupler 14 with the square drive recess 130 of the second socket 20. The lock pin 174 will engage the circumferential groove 154, preventing accidental disconnection. When assembled in this configuration, the drive shank 170 can be coupled to a driving device such as a ratchet handle, drill-driver, or impact driver (not shown). The first socket 18 is open to engage and drive one or more fasteners or devices as described above.

The flip socket as described herein as the advantage of providing a portable, compact driving tool for multiple sizes of fasteners all in one tool. This is more convenient than carrying multiple tools and greatly reduces the chances of one or more tools being lost.

The foregoing has described a flip socket. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

I claim:

1. A flip socket, comprising:
a socket body having a central section extending between a first socket positioned on a first end of the central section and a second socket positioned on a second end of the central section, the first socket including a peripheral wall that terminates at an end face oriented normal to a centerline extending through a longitudinal axis of the socket body, wherein an interior of the first socket includes driving elements adapted to drive fasteners or devices, the driving elements including an inner drive recess defined by four walls which extend axially inward, and wherein the driving elements include a pair of cross slots extending axially inward from the end face and pass through the peripheral wall, bisecting the peripheral wall into two sections, each of the cross slots is bounded by opposed, parallel side faces which blend into a concave, arcuate bottom face, the bottom face is oriented at an acute angle to the centerline, such that an outboard edge of each cross slot is closer to the end face than the inboard edge of the cross slot; and
a coupler adapted to engage one of the first and second sockets, the coupler connecting the flip socket to a driving device to drive a fastener or device.

2. The flip socket of claim 1, wherein the socket body includes a central through-bore along the centerline.

3. The flip socket of claim 1, wherein the driving elements include an outer drive recess positioned adjacent the end face, the outer drive recess defined by:
four flat faces arranged as two pairs of parallel faces; and
an intermediate face oriented normal to the centerline and disposed at a bottom of the outer drive recess.

4. The flip socket of claim 3, wherein the driving elements include outer drive slots arrayed around the outer drive recess, the outer drive slots extending parallel to the centerline and having a generally semi-circular cross-sectional shape.

5. The flip socket of claim 3, wherein the driving elements include an inner drive recess defined by four walls extending axially inward from the intermediate face and terminate at a bottom floor, the inner drive recess adjoining a through-bore of the socket body.

6. The flip socket of claim 5, wherein the through-bore has a circumferential lock groove formed therein.

7. The flip socket of claim 1, wherein the driving elements include a plurality of inner drive slots that are arrayed around the inner drive recess, the inner drive slots extending parallel to the centerline and having a generally semi-secular cross-sectional shape.

8. The flip socket of claim 1, wherein the coupler includes a body extending between a first end and a second end.

9. The flip socket of claim 8, wherein the first end includes a cylindrical nose and a square drive section.

10. The flip socket of claim 8, wherein the second end includes a drive shank.

11. A flip socket, comprising
a socket body having a central section extending between a first socket positioned on a first end of the central section and a second socket positioned on a second end of the central section, the second socket being bound by a peripheral wall that terminates at an end face oriented normal to a centerline that extends through a longitudinal axis of the socket body, wherein an interior of the second socket includes driving elements adapted to drive fasteners or devices, the drive elements including a pair of cross slots extending axially inward from the end face and pass through the peripheral wall, bisecting the peripheral wall into two sections, wherein each of the cross slots is bounded by opposed, parallel side faces which blend into a concave, arcuate bottom face, the bottom face is oriented at an acute angle to the centerline, such that an outboard edge of each cross slot is closer to the end face than the inboard edge of the cross slot; and
a coupler adapted to engage one of the first and second sockets, the coupler connecting the flip socket to a driving device to drive a fastener or device.

12. The flip socket of claim 11, wherein the driving elements include a drive recess positioned adjacent the end face, the drive recess defined by four flat faces arranged in two pairs of parallel faces and a bottom face oriented normal to the centerline and disposed at a bottom of the drive recess.

13. The flip socket of claim 12, wherein the drive recess adjoins a through-bore of the socket body, the through-bore having a circumferential lock groove formed therein.

14. The flip socket of claim 13, wherein the driving elements include a pair of cross slots extending axially inward from the end face and pass through the peripheral wall, bisecting the peripheral wall into two sections, and wherein the cross slots intersect the drive recess.

15. The flip socket of claim 12, wherein the driving elements include drive slots arrayed around the drive recess, the drive slots extending parallel to the centerline and having a generally semi-circular cross-sectional shape.

16. A flip socket, comprising:
a socket body having a central section extending between a first socket positioned on a first end of the central section and a second socket positioned on a second end of the central section, the first socket including a peripheral wall that terminates at an end face oriented normal to a centerline extending through a longitudinal axis of the socket body, wherein an interior of the first socket includes driving elements adapted to drive fasteners or devices, the driving elements including an inner drive recess defined by four walls which extend axially inward, and wherein the driving elements include a pair of cross slots extending axially inward from the end face and pass through the peripheral wall, bisecting the peripheral wall into two sections, each of the cross slots is bounded by opposed, parallel side faces which blend into a concave, arcuate bottom face, the bottom face is oriented at an acute angle to the centerline, such that an outboard edge of each cross slot is closer to the end face than the inboard edge of the cross slot; and a coupler adapted to engage one of the first and second sockets, the coupler connecting the flip socket to a driving device to drive a fastener or device, the coupler including:
  a first end having a cylindrical nose and a square drive section, the square drive section adapted to engage a drive recess of one of the first and second sockets;
  a second end forming a drive shank, the drive shank having a circumferential locking groove near a distal end of thereof.

17. The flip socket of claim 16, wherein the coupler further includes:
  a plunger disposed in a central bore of a body of the coupler;
  a spring positioned between the plunger and the body, the spring forcing the plunger axially towards the cylindrical nose and forcing a lock pin in an outboard position.

18. The flip socket of claim 17, wherein the coupler further includes a handle, wherein pulling the handle compresses the spring and retracts the plunger, thereby moving the lock pin to an inboard position.

* * * * *